United States Patent
Toops, Jr.

[15] 3,640,697
[45] Feb. 8, 1972

[54] NONCAKING, GRAINED AMMONIUM NITRATE

[72] Inventor: Emory Earl Toops, Jr., Terre Haute, Ind.
[73] Assignee: Commercial Solvents Corporation, New York, N.Y.
[22] Filed: Apr. 16, 1969
[21] Appl. No.: 816,815

[52] U.S. Cl. .............................71/27, 71/59, 71/64 E, 23/103, 149/7
[51] Int. Cl. .............................C05c 1/02
[58] Field of Search................71/25, 59, 64, 64 E, 27, 30; 23/103; 149/46, 7; 252/381

[56] References Cited

UNITED STATES PATENTS 2,720,446  10/1955  Whetstone et al. .......................23/103
3,116,185  12/1963  Wilson et al. ..............................149/7

Primary Examiner—Reuben Friedman
Assistant Examiner—Charles N. Hart
Attorney—Howard E. Post and Robert H. Dewey

[57] ABSTRACT

A process for the preparation of noncaking, grained ammonium nitrate by effecting the graining of molten ammonium nitrate in the presence of moisture and sodium alkyl naphthalene sulfonate in a ratio of about 0.01 to 0.1 percent by weight at a temperature from about 230° to over 300° F.

1 Claims, No Drawings

NONCAKING, GRAINED AMMONIUM NITRATE

BACKGROUND OF THE INVENTION

This invention relates to noncaking, grained ammonium nitrate. In a particular aspect, it relates to an improved process for the preparation of noncaking, grained ammonium nitrate.

It has long been common practice to treat at less than 90° F. the prills and granules of fertilizer grade ammonium nitrate with about 0.05 percent of sodium alkyl naphthalene sulfonate and about 3 percent powdered clay to form a coating on the prills and granules which makes them resistant to caking during storage. Grained ammonium nitrate has its principal utility in the explosives industry and powdered clay is objectionable in such applications.

For explosives, sodium alkyl naphthalene sulfonate mixed with such materials as zinc oxide is used to prevent caking of ammonium nitrate. However, when sodium alkyl naphthalene sulfonate alone is added at moderately low temperatures, it has been relatively ineffective in preventing caking.

The graining process consists essentially of introducing molten ammonium nitrate, or a concentrated aqueous solution thereof, at a temperature above 300° F., usually about 340° F., into a graining kettle where it is gradually cooled during constant mixing. The water, if present, begins evaporating immediately due to the temperature and crystallization begins. The mixing is effected by means of rotating, motor driven, curved blades (the plow) which continually scrape the crystals from the bottom and sides and constantly mix the hot mass while the temperature gradually drops. In the temperature range of 260°-300°, any water present is evaporated rapidly. Below 240°-250°, most of the moisture has been driven off and the crystals are coarse. Below 240° and until cool, the crystals are gradually broken up and reduced in size. Previously it has been the practice to add anticaking agents just before the ammonium nitrate is discharged from the kettle. The temperature at this stage is about 180°-200° F. When cool, the ammonium nitrate is in the form of fine, free-flowing crystals, or "grains." The material is then bagged and sent to storage. The anticaking agents previously used are not very effective, however, and the bagged ammonium nitrate usually sets up to a hard cake, frequently within a period of several hours, and must be ground or broken up before use.

SUMMARY OF THE INVENTION

It is an object of this invention to provide noncaking, grained ammonium nitrate.

It is another object of this invention to provide a process for the preparation of noncaking, grained ammonium nitrate.

Other objects of this invention will be apparent to those skilled in the art from the disclosure herein.

An improved process for the production of noncaking ammonium nitrate has now been discovered. According to the improved process, noncaking, grained ammonium nitrate is produced by the step of adding about 0.01 to 0.1 percent by weight of sodium alkyl naphthalene sulfonate (SANS), to the ammonium nitrate in the graining kettle in the presence of at least about 1 percent water or more during the graining operation at a temperature above about 230° F.

DETAILED DISCUSSION

The ammonium nitrate suitable for the graining process can be supplied by any of the known processes, e.g., by the Stengel vapor phase process or by the batch neutralization of aqueous or anhydrous ammonia and nitric acid, followed by concentration. The Stengel process yields a nearly anhydrous, molten product and when it is used as the ammonium nitrate source it is customary to add water to the extent of about 1-1.5 percent by weight.

Ammonium nitrate obtained by the batch neutralization process is in the form of an aqueous solution containing about 50 to 85 percent by weight ammonium nitrate. This solution is evaporated in the heated evaporating pans (so-called high-pans) until the water content has been reduced to about 1-5 percent and the temperature is above 300° F. and usually about 340° F. The liquid ammonium nitrate is then transferred to a previously heated graining kettle where it is grained as described hereinbefore.

The step of adding SANS can be effected in the graining kettle at any time after introducing the ammonium nitrate providing that at least about 1 percent moisture, as indicated by a crystallization temperature of 308° to 315° F., is present in the ammonium nitrate at the time of addition. The water content accordingly can be adjusted as needed. The crystallization temperature is indicative of the water content and is defined as the approximate temperature at which molten ammonium nitrate begins to crystallize. Methods for determining the crystallization temperature are known in the art.

The SANS can be added as an aqueous solution or as a solid, but a solution is generally preferred. Conveniently, if tests show that the water content of the ammonium nitrate must be increased, the SANS may be dissolved in the water to be added. When preferred, the SANS in aqueous solution can be introduced to the graining kettle before the ammonium nitrate is introduced, or the two can be introduced at the same time. Preferably, however, the aqueous SANS is added after the agitator has started to avoid the possible hazard to the operator from steam burns which could arise from the sudden contact of water with the molten ammonium nitrate. Generally the aqueous SANS is added when the temperature of the molten ammonium nitrate is above 300° F., and preferably the addition is made when the temperature is above 320° F.

If the SANS is added as a dry solid, it is preferably added at a temperature of at least 230° F. or higher, preferably above 260° F. No particular mesh size is required for the solid material, but is preferably free from lumps. If lumps are present, however, they are generally broken up during the agitation period.

The SANS, whether solid or aqueous, is added in an amount of from 0.01 to 0.1 percent by weight of the ammonium nitrate, preferably between about 0.03 to 0.1 percent, and the evaporating step is continued until the moisture content has been reduced to about 0.04–0.15 percent by weight. The ammonium nitrate so produced is then discharged from the graining kettle and bagged while still hot, e.g., at a temperature between 200°–230° F.

The SANS suitable for the practice of this invention is commercially available under a variety of trademarks and any commercially available material is suitable for the practice of this invention. The commercial material is usually a mixture wherein the alkyl group generally varies from about five carbon atoms to about 20, usually from 10–20. An example of a s$itable product is that marketed under the trademark Petro-AG, Special, by Petrochemicals Co., Inc., Long Beach, Calif. It is understood, however, that it is not intended that the invention be limited to that product. The product should be free-flowing and preferably, but not necessarily free from lumps or agglomerates. The commercial product is usually received in a sufficiently small particle size that no further grinding is necessary. A comminuted product may sometimes be desirable, but it is not intended that the invention be limited to any particular particle or sieve size.

The improved process of the present invention can be better understood by reference to the following examples. It is understood, however, that the examples are for the purpose of illustrating the invention and it is not intended to be limited thereby.

EXAMPLE 1

One gallon of water was placed in a graining kettle and about 2,000 lbs. of molten ammonium nitrate at a temperature of about 340° F. was added with mechanical agitation. When the kettle was between one-half and one-third full, the ammonium nitrate was sampled and the crystallization temperature was determined to be about 325°. Another gallon of water, in which 1½ lbs. (i.e., about 18 percent by weight) of Petro AG, Special brand of mixed sodium alkyl naphthalene sulfonate was dissolved, was added to the mixture to bring the crystallization temperature to within about 300°–315° F. The evaporating and agitation was then carried out according to known methods.

When the temperature of the mass reached about 200° F., the produce was bagged while still hot and sent to storage. It did not cake but remained pourable and free-flowing even after 6 weeks of storage.

The above example was repeated in all essential details except that the Petro AG, Special was not added until the temperat$re of the ammonium nitrate was about 200° F. It was then added as a finely ground powder and bagged hot at a temperature of 160°–180°. Within a few hours the bagged material had set up to a hard cake which had to be ground before it could be used for explosive manufacture.

EXAMPLE 2

The experiment of Example 1 was repeated in all essential details except that dry, free-flowing sodium alkyl naphthalene sulfonate was added as a solid when the temperature of the ammonium nitrate reached 260° F. The product used was Petro, AG, Special, manufactured by Petrochemicals Co., Inc., Long Beach, Calif. The product as received was finely divided, free-flowing and was determined to be suitable for use without further comminution. The resulting product was bagged when hot and sent to storage. It remained noncaking and free-flowing.

I claim:

1. In a process for the production of noncaking, grained ammonium nitrate by the step of graining molten ammonium nitrate at a temperature of 200° to over 300° F. in the presence of mechanical agitation, the improvement comprising the step of incorporating into said molten ammonium nitrate from about 0.01 to about 0.1 percent by weight of sodium alkyl naphthalene sulfonate as about an 18 percent by weight aqueous solution when the temperature of said molten ammonium nitrate is about 340° F.

* * * * *